(12) United States Patent
Lipponen et al.

(10) Patent No.: US 12,046,782 B2
(45) Date of Patent: Jul. 23, 2024

(54) FUEL CELL POWER SYSTEM

(71) Applicant: ABB Schweiz AG, Baden (CH)

(72) Inventors: Harri Lipponen, Helsinki (FI); Arber Haxhiu, Helsinki (FI); Sami Kanerva, Helsinki (FI); Mikko Kajava, Helsinki (FI)

(73) Assignee: ABB Schweiz AG, Baden (CH)

( * ) Notice: Subject to any disclaimer, the term of this patent is extended or adjusted under 35 U.S.C. 154(b) by 61 days.

(21) Appl. No.: 17/904,146

(22) PCT Filed: Feb. 11, 2021

(86) PCT No.: PCT/EP2021/053344
§ 371 (c)(1),
(2) Date: Aug. 12, 2022

(87) PCT Pub. No.: WO2021/160745
PCT Pub. Date: Aug. 19, 2021

(65) Prior Publication Data
US 2023/0104735 A1 Apr. 6, 2023

(30) Foreign Application Priority Data
Feb. 12, 2020 (EP) ..................................... 20156929

(51) Int. Cl.
*H01M 8/04302* (2016.01)
*H01M 8/04537* (2016.01)
(Continued)

(52) U.S. Cl.
CPC ... *H01M 8/04302* (2016.02); *H01M 8/04559* (2013.01); *H01M 8/0488* (2013.01);
(Continued)

(58) Field of Classification Search
CPC ....... Y02E 60/50; H02J 2300/30; H02J 1/102; H01M 8/04559; H01M 8/04544;
(Continued)

(56) References Cited

U.S. PATENT DOCUMENTS

2005/0206342 A1 9/2005 Aleyraz et al.
2010/0332063 A1* 12/2010 Saeki ..................... B60L 58/30
701/22
(Continued)

FOREIGN PATENT DOCUMENTS

JP 2003132922 A 5/2003

OTHER PUBLICATIONS

European Search Report; Application No. EP 20 15 6929; Issued: Jul. 6, 2020; 2 Pages.
(Continued)

*Primary Examiner* — Ryan Johnson
(74) *Attorney, Agent, or Firm* — Whitmyer IP Group LLC

(57) ABSTRACT

A fuel cell power system and a method of starting a fuel cell power system. The fuel cell power system includes a fuel cell system having one or more voltage outputs, one or more DC/DC converters each having an output and an input, the input being connectable to the voltage outputs of the fuel cell system, a DC voltage link connectable to the output of the one or more DC/DC converters, and a local load connectable to the DC voltage link. In the system, the local load is adapted to draw power from the fuel cell system to decrease the voltage of the fuel cell system.

18 Claims, 4 Drawing Sheets

(51) Int. Cl.
    *H01M 8/04858*    (2016.01)
    *H02J 1/10*    (2006.01)
    *H02J 3/38*    (2006.01)
    *H02M 3/158*    (2006.01)

(52) U.S. Cl.
    CPC ........... *H01M 8/0494* (2013.01); *H02J 1/102* (2013.01); *H02J 3/381* (2013.01); *H02M 3/1584* (2013.01); *H02J 2300/30* (2020.01)

(58) Field of Classification Search
    CPC ......... H01M 8/04888; H01M 8/04302; H01M 8/0488; H01M 8/04865; B60L 58/31; B60L 58/30
    See application file for complete search history.

(56) References Cited

U.S. PATENT DOCUMENTS

| | | | |
|---|---|---|---|
| 2013/0176759 A1* | 7/2013 | Kaneko | H01M 16/006 363/97 |
| 2014/0302415 A1 | 10/2014 | Peterson et al. | |
| 2016/0276938 A1 | 9/2016 | Mima et al. | |

OTHER PUBLICATIONS

International Search Report and Written Opinion of the International Searching Authority; Application No. PCT/EP2021/053344; Completed: Apr. 14, 2021; Mailing Date: Apr. 21, 2021; 10 Pages.

* cited by examiner

FUEL CELL POWER SYSTEM

TECHNICAL FIELD

The invention relates to fuel cell power systems, and particularly to fuel cell power systems having a DC link.

BACKGROUND

Fuel cells are increasingly employed in generating electrical power for various loads. In one application of fuel cells, the output voltage from a fuel cell system is fed to a DC link and the voltage of the DC link is regulated to be within certain limits. The voltage of the DC link is further consumed by various loads typically by using converters. The converters convert the voltage of the DC link for the specific load.

The voltage of the DC link is typically regulated by boost-mode DC/DC converter connected between the output of the fuel cells and the DC link. The fuel cell stacks must be dimensioned to operate below the rated system voltage so that the DC/DC converter can regulate the DC link voltage by boosting the output voltage of the fuel cells. The output voltage of fuel cells is at the highest at the open circuit condition and it decreases with increasing load. Therefore, the DC/DC converters must be dimensioned for both open circuit voltage and full load current, which leads to poor utilization of power conversion capacity. Thus, when the load of the system increases, the output voltage of the fuel cells decreases. The DC/DC converters are operated to keep the DC link voltage within certain limits.

In case of large fuel cell systems having power range of several megawatts, the fuel cell stacks are grouped together in a specific fuel cell space. The output voltage is determined by stacking the fuel cells in series and in particular on top of each other. Typically, there would be space to have more stacks in series, but voltage limitation prevents to utilize the room height in full and more floor area is required.

The above problem could be partly solved by using a buck-boost converter instead of a boost converter, but it would also require more converter hardware or specific drive components. The boost mode converter can be configured from a regular 6-pulse IGBT converter, but a buck-boost converter requires modified hardware.

SUMMARY

An object of the present invention is to provide a method and a system for implementing the method so as to solve the above problem. The object of the invention is achieved by a method and a system which are characterized by what is stated in the independent claims. The preferred embodiments of the invention are disclosed in the dependent claims.

The invention is based on the idea of utilizing a local load during the start-up phase of the fuel cell power system. The invention enables to connect more fuel cell stacks in series and allows to operate the fuel cells at higher voltage during the startup. When the fuel cell system is started, the output voltage of the fuel cell system is first directed to a local load. When the load is increased to the level where output voltage is below the rated system voltage, the fuel cells are connected to the main electrical system through the DC/DC converter. When the voltage is below the rated voltage of the DC/DC converters, the DC/DC converters can be started.

By using this invention, it is possible to reduce the amount of power converters and cabling in large fuel cell systems. It will also enable to pack the fuel cell stacks in more efficient way and utilize the available space better.

BRIEF DESCRIPTION OF THE DRAWINGS

In the following the invention will be described in greater detail by means of preferred embodiments with reference to the attached drawings, in which.

DETAILED DESCRIPTION

Figure 1:
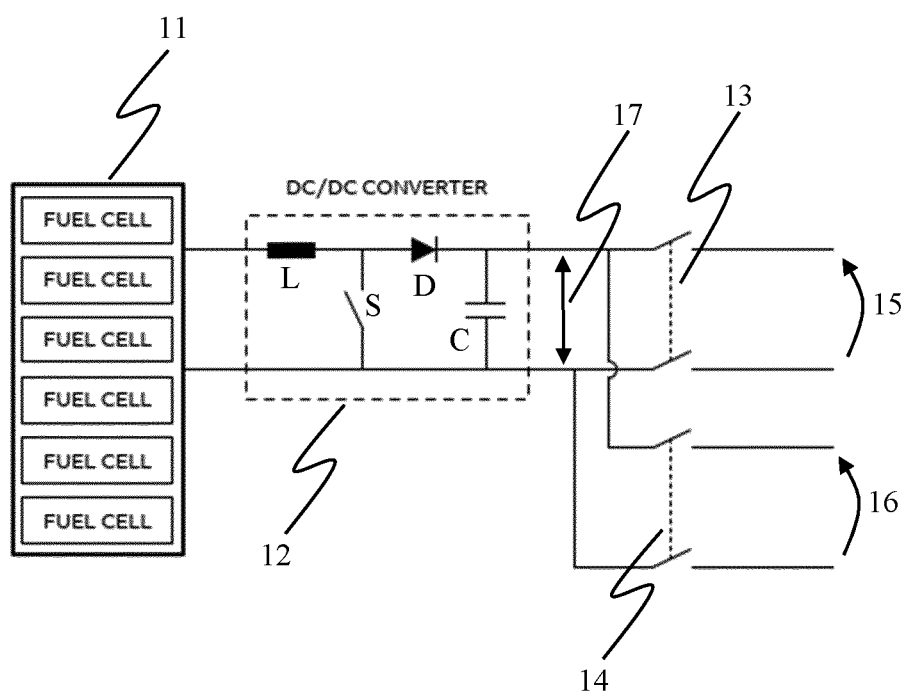
FIG. 1 shows a simplified structure of an embodiment of the invention.

FIG. 1 shows a simplified circuit of an embodiment of the invention. FIG. 1 shows a stack of fuel cells 11, the output of which is connected to a DC/DC converter 12. The converter is shown to comprise an inductor L, a diode D, a controllable switch S and a capacitor C. The converter 12 is of a boost-type converter which can be operated to increase the voltage of the input to a higher voltage at the output. The output of the DC/DC converter is connected to a main switch 13 to connect the output voltage of the converter to a main load 15. The output of the converter 12 also comprises an auxiliary switch which can be used to connect the output voltage of the converter to a local load.

By default, the main and auxiliary switches are operated such that either the main switch or the auxiliary switch are conducting, that is, when one of the switches is controlled conductive, the other is controlled to a blocking state at the same time. The auxiliary switch can be left closed in case the auxiliary load and it's energy is needed and used in a process.

According to the present invention, a fuel cell power system comprises a fuel cell system 11 having one or more voltage outputs. In the example of FIG. 1, the fuel cell system has one voltage output. With a fuel cell system, it is referred to a system of fuel cells having multiple of fuel cells connected in series. A fuel cell system may also comprise any auxiliary equipment which may be required to operate the fuel cells in such a manner that electrical energy is obtained from the fuel cells.

The fuel cell power system of the invention comprises further one or more DC-DC converters. Each DC/DC converter has an output and an input and the input being connectable to the voltage outputs of the fuel cell system. The fuel cell system may comprise multiple of voltage outputs. The outputs are formed of separate stacks of fuel cells. Each DC/DC converter is connected to a voltage output of the fuel cell system. Thus, parallel DC/DC converters may be fed from parallel stacks of fuel cells. In the embodiment of FIG. 1, a DC/DC converter 12 is connected to a stack of fuel cells 11 such that the voltage output of the fuel cell system is connected to the input of the DC/DC converter.

According to the invention, the power system comprises a DC voltage link connectable to the output of the one or more DC/DC converters. In the embodiment of FIG. 1, the DC voltage link 17 is shown connected to the output of the DC/DC converter. The capacitor C of the converter 12 supports the voltage of the DC voltage link. In case the power system comprises multiple of DC/DC converters, their outputs are preferably connected to the same DC voltage link. In such a case multiple of converters feed power from separate fuel cell stacks to a common DC link.

Further the present invention comprises a local load connectable to the DC voltage link. FIG. 1 shows an embodiment in which the local load can be connected to the DC voltage link using the auxiliary switch 14. The local load is adapted to draw power from the fuel cell system to decrease the voltage of the fuel cell system. In the invention, the local load can be used for loading the fuel cell system so as to decrease the output voltage of the fuel cell system. The voltage of the voltage output of a fuel cell decreases when the current drawn from the fuel cell increases.

In the system of the invention the one or more DC/DC converter is not operated during the start-up of the fuel cell system. As known, the output voltage of a fuel cell system is at the highest with zero current. That is, the open circuit voltage of a fuel cell is the highest voltage that can be obtained from a fuel cell. The voltage decreases quite rapidly when the fuel cell is loaded, i.e. current is drawn from the fuel cell. When the converter 12 is not operated during the start-up, the switch S of the converter is not modulated. As the fuel cell system of FIG. 1 is started, a high voltage is produced to the input of the DC/DC converter. In known structures fuel cells are started without load and open circuit voltage is reached and the current path is formed with additional switches once the OC voltage is reached. This operation in the known structure requires additional switch components. In the present invention, however, a current starts to flow through the inductor L and diode D and charges the capacitor C and the voltage is not allowed to reach the open circuit voltage value. When the voltage of the capacitor nears the output voltage of the fuel cell stack, the current from the fuel cell stack decreases increasing the output voltage of the fuel cell stack. Once the voltage of the capacitor is close to the rated voltage of the switch S of the converter, the auxiliary load is connected to the system. The auxiliary load draws current from the fuel cell system and thus the output voltage of the fuel cell stack is decreased. The auxiliary load may be a simple resistor which is dimensioned such that when current from the fuel cell system is flowing through the resistor, the voltage of the capacitor and thus the voltage of the DC link, does not exceed the voltage rating of the system and especially the voltage rating of the controllable switch S.

When power from the fuel cell system is fed to a local load and the DC voltage is below the rated voltage of the system, the DC/DC converter can be operated to boost the DC link voltage and to control it to desired level. Once the DC link voltage is regulated by the one or more DC/DC converters, the main switch 15 and the auxiliary switch 16 can be operated to connect the DC link voltage from the local load to the main load.

With the invention, the output voltage from the fuel cell system can be dimensioned to be higher than the rated voltage of the one or more converters connected to the fuel cell system.

Compared to conventional system, more fuel cell stacks can be connected in series also producing higher voltage. At the startup of the fuel cell system, the fuel cell output voltage increases immediately to the open-circuit voltage (OCV), which may be higher than the rated system voltage. For example, the system voltage may be 1000 VDC and the open circuit voltage of the fuel cells may be 1200 VDC. At this point the output voltage is connected to a local load that is able to operate at variable voltage up to the OCV level. This local load can be a simple resistor bank, a component of the balance of plant or some other load supplied directly or through a power converter.

As the local load begins to draw current from the fuel cells, the output voltage of the fuel cells decreases according to a known polarization curve. The voltage and load current are related to each other so that at certain load the output voltage has decreased to a level that is lower than the rated system voltage. This load point is designed to be at the 10-30% of the maximum loading of the fuel cell system. At this instant, the fuel cells are connected to the main electrical system through the DC/DC converter and the local load is disconnected.

Figure 2:
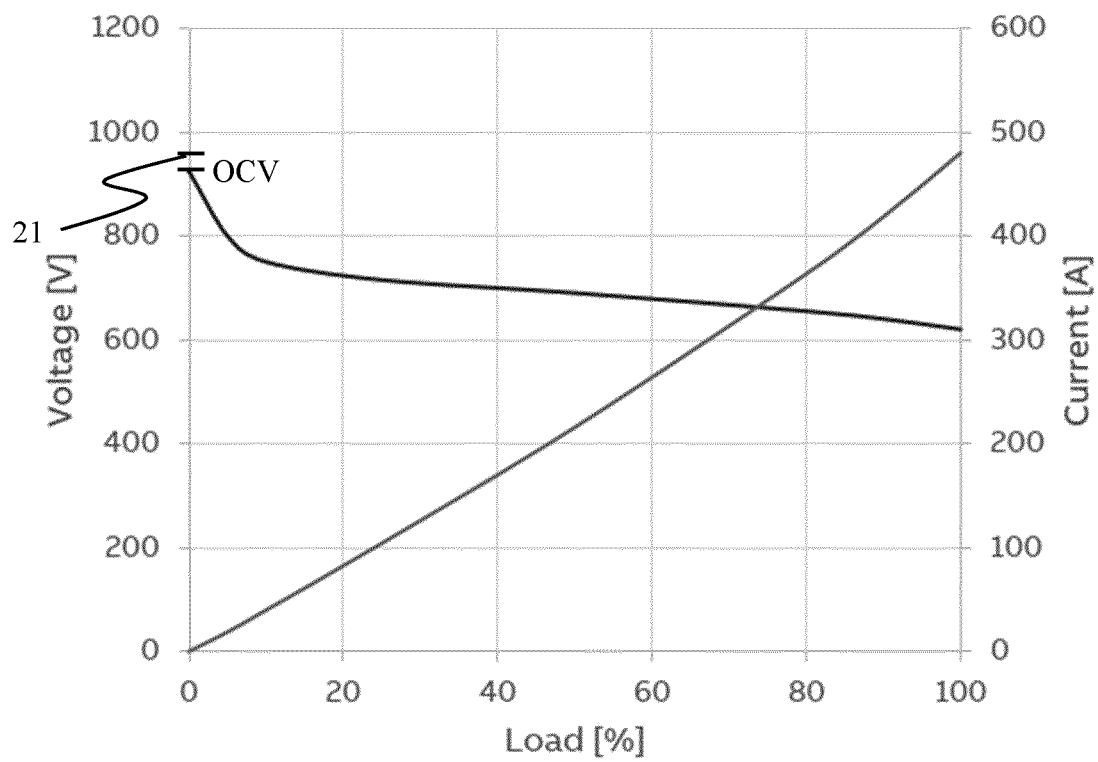
FIGS. 2 and 3 show polarization curves of fuel cell stack.

FIG. 2 represents a typical polarization curve in connection with a conventional system, in which the voltage rating 21 of the system is higher than the open circuit voltage OCV of the fuel cells. In FIG. 2, the open circuit voltage of the fuel cell stack is shown to be approximately 950 Volts. As seen, the output voltage of the fuel cell stack decreases rapidly when current is drawn from the fuel cell. Typically, minimum load for continuous operation of a fuel cell is approximately 20-30% of the rated load. At this point the fuel cell output voltage has decreased to ca. 80% of the open circuit voltage. Further, at the full load the output voltage is shown to be approximately 65% of the open circuit voltage and of the rated voltage of the devices. As mentioned, in known designs electrical system has been dimensioned to be operated also with voltages equaling the open circuit voltage.

Figure 3:
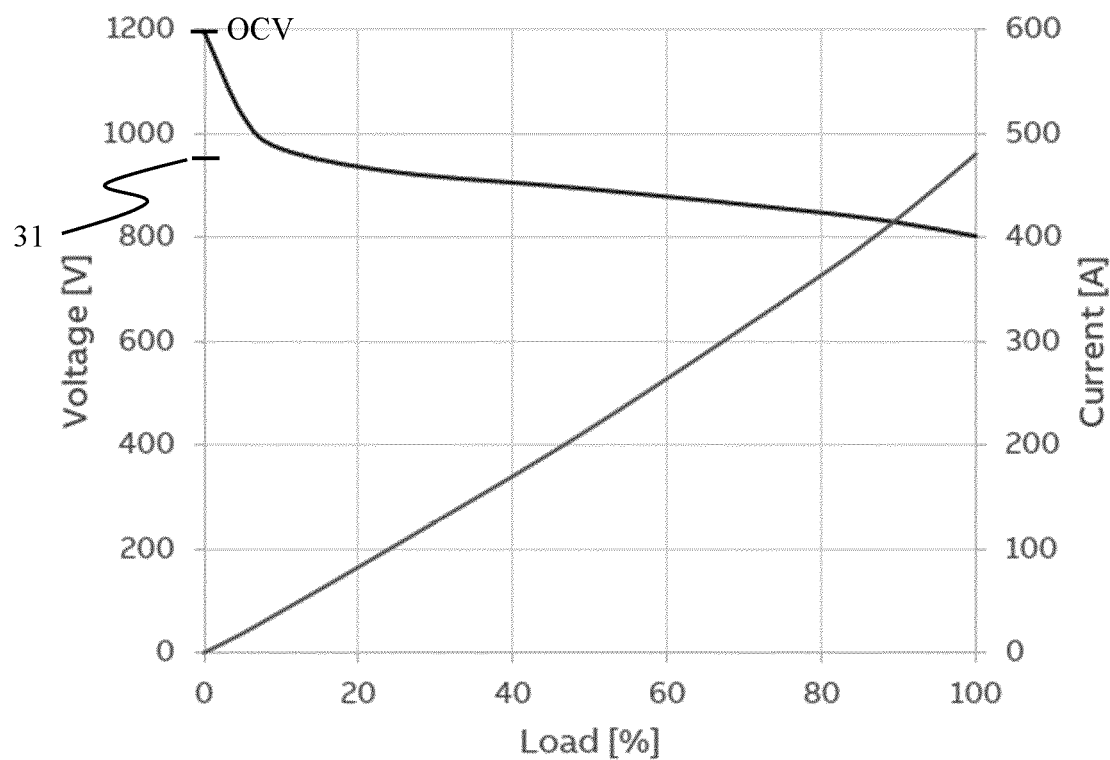

FIG. 3 shows a dimensioning together with a polarization curve which is achievable with the present invention. The fuel cell stack has a higher open circuit voltage OCV than shown in the example of FIG. 2. However, the voltage rating 31 of the system components, and specifically of the one or more converters, is the same as in the example of FIG. 2. Thus, in the example of FIG. 3, the open circuit voltage of the fuel cell stack is higher than the voltage rating of the one or more converters connected to the output of fuel cell stack. This dimensioning is possible with the present invention as the power from the fuel cell stack is connected to a local load when the voltage from the fuel cell stack is higher than the voltage rating of the system.

In the dimensioning obtainable with the invention, the voltage at the minimum load is at the same level as the open circuit voltage in the example of FIG. 2. Further, at the full load, the fuel cell output voltage is approximately 80% of the rated voltage of the one or more converters. The rated power of the fuel cell system can be increased with the dimensioning. As the rated power is increased using a similar converter, the losses of the system can be lowered considerably.

Figure 4:
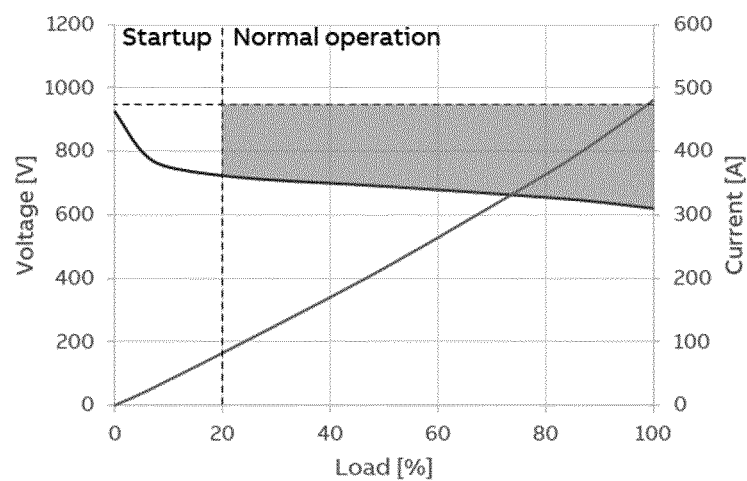
FIGS. 4 and 5 shows the polarization curves of FIGS. 2 and 3 with operation ranges.
Figure 5:
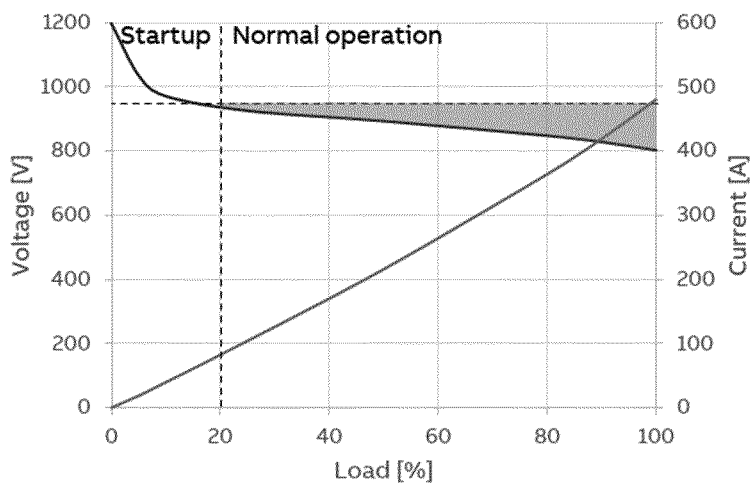

FIGS. 4 and 5 show the polarization curves of FIGS. 2 and 3. In FIGS. 4 and 5 additional vertical line shows the limit of normal operation, which is approximately 20% of the rated load. When a fuel cell is used, the loading of the fuel cell is kept above 20% of the rated load. The fuel cell is at startup region when the load of the fuel cell is below 20%. The use of the fuel cell is not feasible in this region and the operation is mainly performed with the loading of over 20%.

FIG. 4 further shows a horizontal line representing the voltage rating of the system and especially of the one or more DC/DC converters. As seen from FIG. 4, the one or more DC/DC converters are not operated close to the rated voltage as the loading of the fuel cell system dictates the output voltage of the fuel cell.

FIG. 5 shows corresponding horizontal and vertical lines as shown also in FIG. 4. It is seen, that the gap between the rated voltage and the operating voltage is much smaller when the system is dimensioned as allowed by the present invention. When operating closer to the rated voltages, more power is available from the system and the operation can be carried out with decreased losses.

Figure 6:
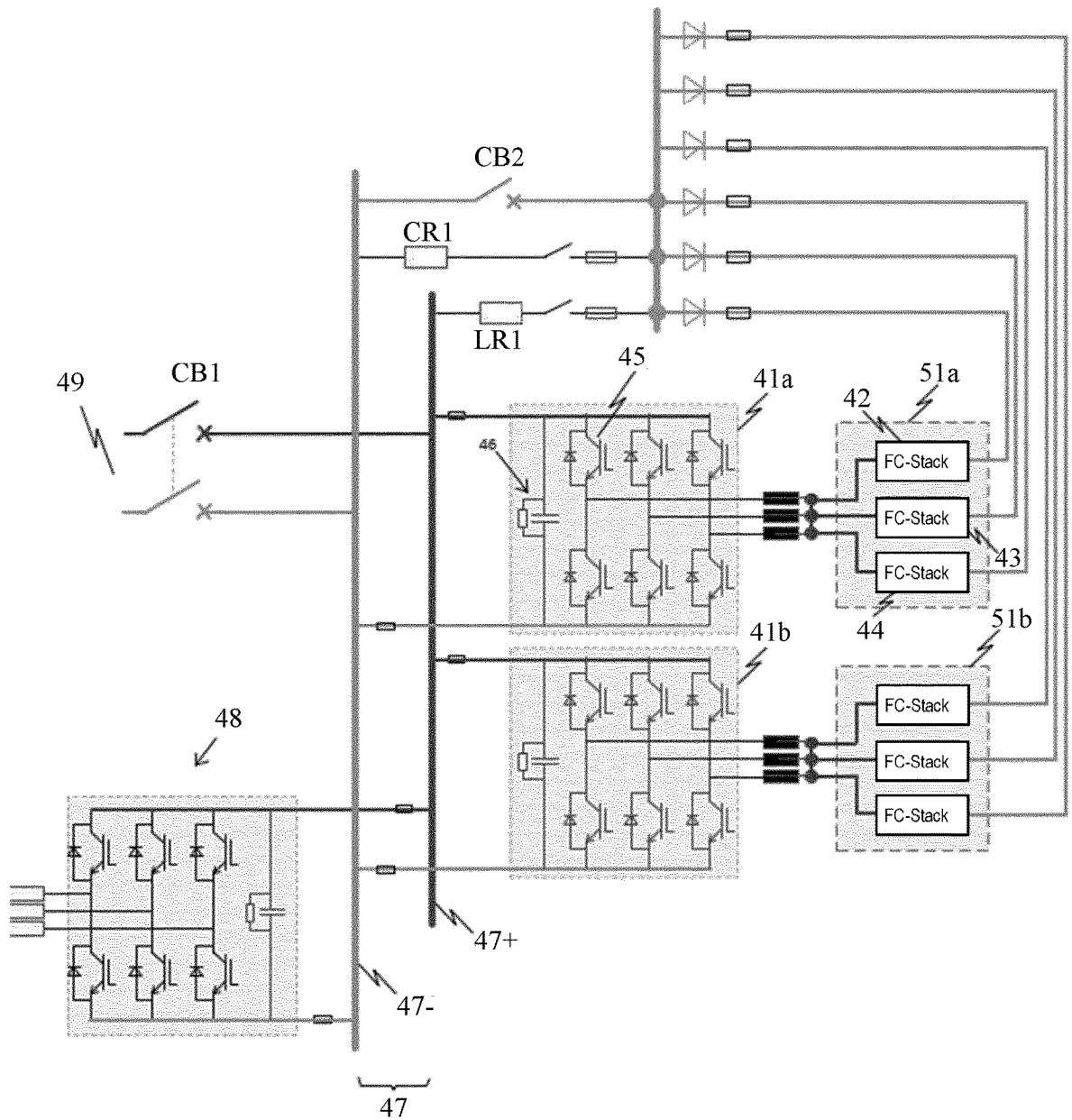
FIG. 6 shows an embodiment of the system of the invention.

FIG. 6 shows an embodiment of the system of the invention. In the embodiment, two fuel cell systems 51A, 51B are employed. Both of the fuel cell systems are shown to be consisting of three fuel cell stacks 42, 43, 44. The fuel cell systems 51A and 51B are parallel systems and have similar structures and components. Therefore, only one A of the parallel systems is considered here.

The voltage outputs of the fuel cell stacks are connected to a DC/DC converter 41A. In the example the boost-type DC/DC converter is formed of a three-phase inverter bridge having six controllable switch components and their antiparallel diodes. A three-phase inverter bridge is selected here as an example as they are commonly available in a single module. However, the DC/DC converters used in the invention can also be formed from discrete components, if desired.

When the fuel cell power system of FIG. 6 is started, the fuel cells begin to produce voltage. The fuel cells and their associated support devices are started, and a current path is closed using a charging resistor CR1 i.e. DC charging resistor. As mentioned above, in known systems the voltage of the system reaches the open circuit voltage prior to closing the current path. Once the charging resistor is closed, current starts to flow in the circuit. The operation is described here mainly with reference to a single fuel cell stack 42 as the parallel current paths are similar. Electrical parameters and power dimensioning of the charging resistor is done in relation to the number of installed parallel DC/DC converters in a system.

Current flows from the fuel cell stack 42 through inductance HDCL to the DC/DC converter 41A. As seen from the FIG. 6, the positive outputs of the fuel cell stacks in one fuel cell system 51A are connected together prior to the inductance HDCL. The current from the fuel cells flow through the inductor and through the antiparallel diodes of the upper switches. For example, the antiparallel diode of switch component 45 is positively biased and current is able to flow through the diode. Positive rail 47+ of the DC voltage link 47 is in the current path after the diode. Current flows further through the capacitor bank 46 to the negative rail 47− of the DC voltage link. The capacitor bank is charged by the current and the voltage over the capacitor bank is the voltage of the DC link. As the charging resistor is connected, the current flows further back to the negative poles of the fuel cells through the charging resistor and return lines. The charging resistor is dimensioned such that value of current stays within acceptable range so that overcurrent protection does not trip.

The capacitor bank 46 and the DC link is charging towards the output voltage of the fuel cell stacks, and the controllable switches of the DC/DC converter are not operated. When the DC link voltage gets closer to the output voltage of the fuel cell stack, the charging current decreases. The decreasing current also means that the fuel cell output voltage increases. When the DC link voltage reaches a certain pre-set value, a local load is connected to so that the loading of the fuel cell stack is increased and the output voltage from the fuel cells is decreased.

FIG. 6 includes a load resistor LR1 which can be connected across the DC voltage link to produce additional loading such that the output voltage of the fuel cell stack decreases below a desired limit. The load resistor LR1 is used as a local load and to load the fuel cells such that DC/DC converter can be started safely. When the load resistor has been in the circuit for a short while, the voltage has decreased to a safe level, and the DC/DC converter can be started. At the same time, the charging resistor can be removed from the current path by opening the current path and closing another switch which forms lower-ohmic current path. Further, when the DC/DC converter is operated to control the DC link voltage, power can be fed to the main load 49 and the load resistor can be removed by opening the corresponding contactor or switch. The main load as such is not shown in the drawing. It is, however, clear, that power from the fuel cell power system is fed to a consumer. In the example, the DC link is extended to the main load through a contactor.

FIG. 6 shows another local load 48 which is formed of a converter, and especially of an inverter bridge. The output of the inverter bridge is shown to be connected to resistors BR. The inverter bridge is connected to the DC voltage link, and it can be used for lowering the voltage of the fuel cell stacks by feeding power to the resistors BR. Thus, instead or in addition to the loading resistor, the inverter bridge is used for lowering the voltage of the fuel cell stack such that the DC/DC converter can be started.

According to an embodiment, the voltage rating of the inverter bridge acting as a local load is higher than the voltage rating of the DC/DC converters. When the voltage rating is higher than the open circuit voltage of the fuel cell stack, then the DC link voltage may be initially charged to a higher level. Then when the inverter bridge is started, it draws power such that the DC/DC converters can be safely started.

An advantage of the inverter bridge as a local load is that it can be used for decreasing the voltage of the DC link even when power is fed to the main load 49. This can be advantageous in situations where sudden changes occur in the loading of the system. Further, when connecting the fuel cell power system to the main load, the inverter bridge as a local load can be used in controlling the DC link voltage level to match the voltage of the main load, for example. Further, when the number of parallel fuel cells is increased, the inverter bridge can be used to absorb voltage fluctuations due to sudden changes and to control the voltage to be at the desired level. The inverter bridge can also be controlled with a power reference, i.e. a value of power can be given as a reference value to the inverter bridge. When the power reference is, for example, 20% of the rated power, the operation of the system is in normal operation range as described above with reference to FIG. 5.

In the example of FIG. 6, the output of the inverter acting as a local load is shown to be a resistor bank. However, it is clear that instead of resistors, power can be fed to a motor or to on grid/off grid converter, for example.

The one or more DC/DC converters are formed in the example of FIG. 6 by the inductor HDCL, antiparallel diode of the upper switch component, the lower switch component and the capacitor. The formed circuit corresponds to that shown in the simplified structure of FIG. 1. The upper switch component refers to a switch component which is connected to the positive rail 47+ of the DC link and correspondingly the lower switch component refers to a switch component which is connected to the negative rail 47−. The topology of the DC/DC converter is typical boost-converter. FIG. 6 shows six boost converters connected in parallel and feeding power to the same DC link.

It will be obvious to a person skilled in the art that, as the technology advances, the inventive concept can be implemented in various ways. The invention and its embodiments are not limited to the examples described above but may vary within the scope of the claims.

The invention claimed is:

1. A fuel cell power system comprising:
   a fuel cell system having one or more voltage outputs, one or more DC/DC converters each having an output and an input, the input being connectable to the voltage outputs of the fuel cell system,
   a DC voltage link connectable to the output of the one or more DC/DC converters, and
   a local load connectable to the DC voltage link,
   wherein the local load is adapted to draw power from the fuel cell system to decrease the voltage of the one or more voltage outputs, and
   wherein the open circuit voltage of the fuel cell system is higher than the rated voltage of the one or more DC/DC converters.

2. The fuel cell power system according to claim 1, wherein the local load is adapted to draw power from the fuel cell system prior to starting the one or more DC/DC converters.

3. The fuel cell power system according to claim 1, wherein the local load is a resistor which is connectable between a positive rail and a negative rail of the DC link.

4. The fuel cell power system according to claim 1, wherein the local load is a local load converter circuit the input of which is connected between a positive rail and a negative rail of the DC link.

5. The fuel cell power system according to claim 1, wherein the local load is a combination of a local load converter circuit and a load resistor that are connected between a positive rail and a negative rail of the DC link.

6. The fuel cell power system according to claim 4, wherein the local load converter circuit is an inverter.

7. The fuel cell power system according to claim 6, wherein the local load converter circuit is adapted to feed power to a load.

8. The fuel cell power system according to claim 4, wherein the rated voltage of the local load converter circuit is higher than the open circuit voltage of the fuel cell system.

9. A method of starting a fuel cell power system, the fuel cell power system comprising a fuel cell system having one or more voltage outputs,
   one or more DC/DC converters each having an output and an input, each input being connectable to a voltage output of the fuel cell system,
   a DC voltage link connectable to the output of the one or more DC/DC converters, and
   a local load connectable to the DC voltage link, the method comprising
   charging the DC voltage link from the fuel cell system through a charging resistor and diodes of the one or more DC/DC converters,
   determining the voltage of the DC voltage link,
   connecting a local load to the DC voltage link when the voltage of the DC voltage link exceeds a set limit for lowering the output voltage of the fuel cell system, and
   starting the operation of the DC/DC converters.

10. The method according to claim 9, wherein connecting a local load to the DC voltage link comprises,
   connecting a loading resistor between a positive rail and a negative rail of the DC link.

11. The method according to claim 9, wherein connecting a local load to the DC voltage link comprises,
   operating a converter circuit the input of which is connected to a positive rail and a negative rail of the DC link.

12. The method according to claim 11, wherein operating the converter circuit comprises
   providing a power reference for the converter circuit,
   operating the converter circuit to feed power to a load connected to the output of the converter circuit according to the power reference.

13. A fuel cell power system comprising:
   a fuel cell system having one or more voltage outputs, one or more DC/DC converters each having an output and an input, the input being connectable to the voltage outputs of the fuel cell system,
   a DC voltage link connectable to the output of the one or more DC/DC converters, and
   a local load connectable to the DC voltage link,
   wherein the local load is adapted to draw power from the fuel cell system to decrease the voltage of the one or more voltage outputs, and
   wherein the local load is a combination of a local load converter circuit and a load resistor that are connected between a positive rail and a negative rail of the DC link.

14. The fuel cell power system according to claim 13, wherein the local load is adapted to draw power from the fuel cell system prior to starting the one or more DC/DC converters.

15. The fuel cell power system according to claim 13, wherein the local load is a resistor which is connectable between the positive rail and the negative rail of the DC link.

16. The fuel cell power system according to claim 13, wherein the local load converter circuit is an inverter.

17. The fuel cell power system according to claim 16, wherein the local load converter circuit is adapted to feed power to a load.

18. The fuel cell power system according to claim 13, wherein the rated voltage of the local load converter circuit is higher than the open circuit voltage of the fuel cell system.

* * * * *